US006142284A

United States Patent [19]

Saltsov

[11] Patent Number: 6,142,284

[45] Date of Patent: Nov. 7, 2000

[54] MODULAR BILL ACCEPTOR

[75] Inventor: Leon Saltsov, Thornhill, Canada

[73] Assignee: CashCode Company Inc., Concord

[21] Appl. No.: 09/273,467

[22] Filed: Mar. 22, 1999

[51] Int. Cl.[7] .......... G06K 7/00

[52] U.S. Cl. .......... 194/207

[58] Field of Search .......... 194/206, 207; 235/379; 209/534

[56] References Cited

U.S. PATENT DOCUMENTS

| | | | |
|---|---|---|---|
| 5,304,813 | 4/1994 | De Man . | |
| 5,430,664 | 7/1995 | Cargill et al. | 194/207 |
| 5,657,847 | 8/1997 | Tod et al. . | |
| 5,964,336 | 10/1999 | Itako et al. | 194/207 |

FOREIGN PATENT DOCUMENTS

| | | |
|---|---|---|
| 0338123 | 10/1989 | European Pat. Off. . |
| 0606959 | 7/1994 | European Pat. Off. . |

*Primary Examiner*—Robert P. Olszewski
*Assistant Examiner*—Bryan Jaketic

[57] ABSTRACT

An acceptor for evaluating banknotes, or other paper forms of payment, that includes a replaceable sensor module which communicates in a standardized manner with a central processing unit. The sensor module includes a series of sensors and the signals of the sensors under go primary processing by the sensor module to correct for at least individual characteristics of the sensor module. The central processing unit can be updated if required for different applications. This arrangement adds considerable flexibility in maintenance of the acceptor as well as changing the application of the acceptor.

18 Claims, 2 Drawing Sheets

MODULAR BILL ACCEPTOR

FIELD OF THE INVENTION

The present invention relates to currency validators and bill acceptors which can be easily modified.

BACKGROUND OF THE INVENTION

Bill acceptors are widely used in the vending, bottling, gaming, entertainment and transportation industries. The known bill acceptors move a banknote along a predetermined path, past a series of sensors provided in the walls of the path to evaluate the physical properties of the banknote. These sensors produce signals which are processed and compared to a standard to determine whether the banknote should be accepted. Based on the data obtained, the electronic processing arrangement determines the nominal value of the banknote and the validity of the banknote. These devices are designed for use in association with several different denominations of banknotes of a specific currency. Problems can occur over time, in that the specific denominations to be evaluated by the banknote acceptor may no longer be appropriate or there could be a need to change the evaluation process for determining whether a bill is authentic. For example, fraudulent banknotes are specifically designed to try to duplicate authentic notes, and there is a continuous process of introducing fraudulent notes which are more difficult to protect. At the time of the manufacture of the bill acceptor, the bill acceptor may include standards which fully distinguish authentic banknotes from fraudulent banknotes, however, in time and with the introduction of new and superior banknotes, this may not be true.

It would also be desirable to change the currency which the banknote acceptor evaluates. Previously, banknote acceptors have been essentially dedicated to a single currency and are difficult to modify for a different currency.

SUMMARY OF THE INVENTION

A banknote validator according to the present invention comprises a banknote inlet for receiving a banknote, a transport arrangement for transporting banknotes along a path for processing, at least one removable sensor module located in the wall of the pathway for sensing properties of the banknotes, as the banknotes are transported along the pathway past the at least one removable sensor module, a central processing unit separated from the at least one removable sensor module and in electrical communication with the removable sensor module to receive signals of each sensor module and process and compare the signals to standards for determining the authenticity of a sensed banknote. The at least one removable sensor module produces at least one signal reflective of the characteristics of each banknote as it moves past the sensor module and corrects the signal for individual characteristics of the sensor module to produce a standardized sensed signal of the banknote, the sensor module provides the standardized signal to the central processing unit for further processing.

The removable sensor module includes its own processing arrangement and as such, can be updated in a convenient way merely by removing the sensor module and inserting a further sensor module. This further sensor module can examine different parts of the bill, or include different sensors and as such, the sensor module can be updated to bring the banknote acceptor up to the current standard.

According to an aspect of the invention, each sensor module includes a code signal identifying the number of sensors in the sensor module and the type of the sensors and this code signal is provided to the central processing unit. The central processing unit can then query the sensor module and appropriately process the signals from the sensor module. In this way, if a sensor module having a first series of sensors is replaced by a sensor module having a second different series of sensors, the new sensor module communicates this information to the central processing unit in the code signal and as such, the central processing unit will process the signals in an appropriate manner.

According to a further aspect of the invention, the sensor module is tested at the time of manufacture and includes individual parameters used to bring the sensed signal of the sensor module into conformity with respect to a particular standard. For example, the sensing units of the module can have their own individual characteristics, however, these are corrected for in the sensor module prior to communication of the signal to the central processing unit. The correcting of the signal in the sensor module allows the central processing unit of the banknote validator to process the signals of different sensor modules normally without changes to the central processing unit.

A banknote validator according to the present invention comprises a banknote inlet for receiving a banknote, a transport arrangement for transporting banknotes along a pathway for processing, at least one removable sensor module located in a wall of the pathway for sensing properties of the banknotes as the banknotes are transported along the pathway past the removable sensor module, a central processing unit that is separated from the removable sensor module and in electrical communication with the removable sensor module to receive signals therefrom. The central processing unit processes and compares the signals to a standard for determining the authenticity of a sensed banknote. The removable sensor module comprises a casing having a series of sensors for evaluating different properties of banknotes, a signal processing and quantization unit which receives the signals of the series of sensors and converts the signals into a unified code, a sensor control arrangement for receiving instruction signals from the central processing unit of the validator and sending signals to the central processing unit, an electrical interface connection exterior to the casing for connecting the sensing module with the central processing unit.

According to an aspect of the invention, each sensing module includes individual parameters used by the signal processing in quantization during conversion of the respective signals of the sensors to a standard to compensate for known characteristics of each sensor.

According to a further aspect of the invention, each sensing module includes non-volatile memory associated with the signal processing and quantization unit and these individual parameters for each sensor are stored in this non-volatile memory.

According to yet a further aspect of the invention, the validator includes at least two sensing modules where each sensing module includes a different series of sensors.

According to yet a further aspect of the invention, each sensing module includes a code identifying the number of sensors and the type of the sensors which code is provided to the central processing unit.

BRIEF DESCRIPTION OF THE DRAWINGS

Preferred embodiments of the invention are shown in the drawings, wherein.

DETAILED DESCRIPTION OF THE PREFERRED EMBODIMENTS

The banknote acceptor or validator 1 includes a bill transportation unit 2 comprising a series of drive wheels located to one side of a pathway along which the banknote is moved. The pathway is defined by the bill guides 3. The pathway opens to the inlet 7 through which a banknote is inserted. The acceptor recognizes an inserted banknote and then pulls the banknote into the acceptor by means of the bill transportation unit 2.

Figure 1:
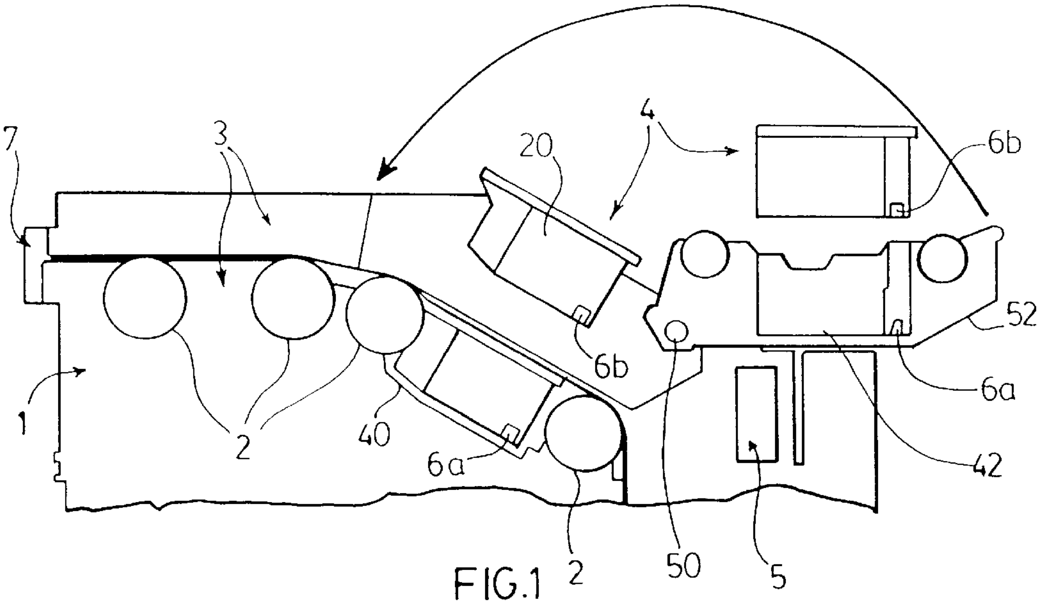
FIG. 1 is a side view with the banknote acceptor in an open position with the replaceable sensor modules about to be inserted in the walls of the pathway.

The validator has a split housing with one part 52 pivoted outwardly about axis 50 to the open service position as shown in FIG. 1.

Figure 2:
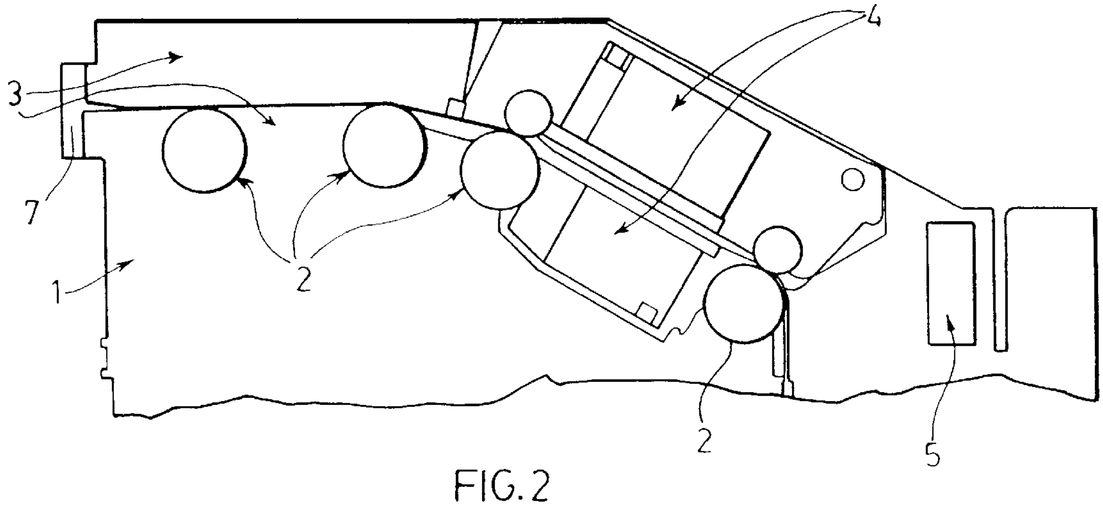
FIG. 2 is a view similar to FIG. 1, with the replaceable sensor modules located in the walls of the pathway.

Replaceable sensor modules 4 are located in the walls of the bill guides 3. In FIG. 1, these are shown in a removed condition and about to be inserted into recess 40 provided on one side of the pathway and recess 42 provided on the opposite side of the pathway. These removable sensor modules are shown in their operative position in FIG. 2. The replaceable sensor modules 4 are inserted into the recesses 40 and 42 and are positively retained in these recesses. Each replaceable sensor module 4 includes a female electrical connection **6*b*, which cooperates with the male electrical connection 6*a* to electrically connect the sensor module with the central processing unit 5** of the acceptor.

Each of the replaceable sensor modules include a series of sensors for evaluating different physical properties of a banknote as it moves past the sensors. The sensors convert the bill's physical properties into electrical signals which undergo primary processing in the sensor module, prior to communication of the processed signal to the CPU for further processing. Each sensor module has a series of sensors, such as optical, magnetic, capacitive or inductive sensors for example, appropriately located for scanning a bill or a portion thereof as it moves past the sensor module.

Figure 3:
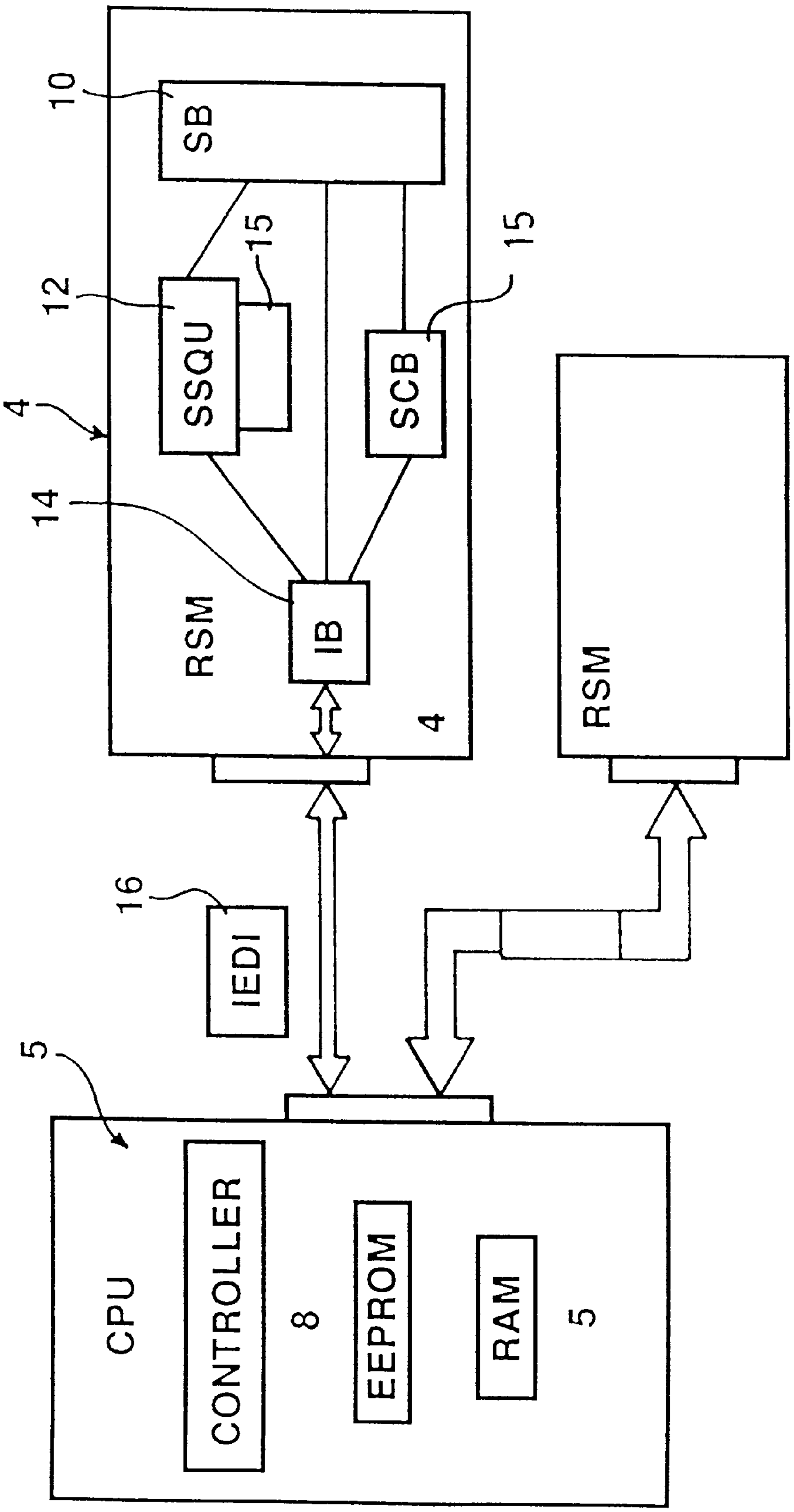
FIG. 3 is a block schematic showing the cooperation of the replaceable sensor modules with the central processing unit of the validator.

As shown in FIG. 3, the replaceable sensor module 4 contains electronic circuitry for the primary conversion of the electrical signal from the series of sensors 10. These sensors are located in particular locations in the replaceable sensor module and are enclosed within the housing 20. The series of sensors 10 cooperate with a signal processing unit 12 which process and quantize the signals from the sensors. The unit 12 uses individual parameters of the sensors to standardize the signal from the sensors for evaluation eventually by the central processing unit (CPU) 5. In addition, the sensor module includes a sensor control block 15 which is in communication with the CPU and controls the series of sensors 10. The interface block 14 standardizes the signals for communication to the CPU 5. The signal from the replaceable module 4 is communicated to the CPU 5 through a dedicated internal exchange digital interface 16.

With the arrangement, the replaceable sensor module is entirely autonomous and self-sufficient. The sensor module is controlled by signals from the CPU and received by the internal exchange digital interface which instructs the sensor module to provide signals to the central processing unit 5. The sensors of the replaceable sensor module produce signals which are standardized and processed into analog or digital electrical signals of a suitable form for transmission to the central processing unit 5. In this way, a sensor module can be replaced to insert a more current sensor module. This current sensor module can, through the primary processing, improve the ability of the validator to properly discriminate between authentic and fraudulent banknotes. The current sensor module can be designed such that the signals sent to the CPU can be processed as if they were from the original sensor module. If desired, the processing by the CPU can also be modified, but this in many cases is not required. Furthermore, this arrangement allows a defective sensor module or damaged sensor module to be quickly replaced. The individual parameters of the new sensor are corrected preferrably by the primary processing of the sensor module.

The replaceable sensor module 4 is connected to the CPU 5 through standard cables and connectors, and the number of contacts of this connection does not depend on the number and type of sensors. In this way, the number and type of sensors can obviously change as may be required at a later date. The replaceable sensor module exchanges a code signal with the central processing unit which contains control signals used by the central processing unit to control the replaceable sensor module. These command signals allow the proper exchange of data from the replaceable sensor module to the CPU. The internal exchange digital interface enables the CPU to request information with respect to the type of replaceable sensor module as well as the number and type of sensors of that module. This information allows the CPU to effectively query the replaceable sensor module and the sensors thereof as appropriate for the CPU to make determinations with respect to the authenticity of a banknote.

The individual sensors of the replaceable sensor modules do vary, and therefore, the replaceable sensor module, as part of the primary processing, processes the signals to standardize the signal to take into account individual parameters of the sensors. These individual parameters are stored in non-volatile memory of the replaceable sensor module. Therefore, although the individual replaceable sensor modules will have sensors which produce different signals, these signals are corrected, such that the CPU receives a corrected signal and therefore can compare it with the standard contained in the CPU.

With the arrangement as described above, the replaceable sensor modules 4 are essentially independent from the CPU 5 and this allows changes to the structure and features of the replaceable sensor module at a later date easily and at low cost. The design of the banknote acceptors are not dependent upon increasing or decreasing the number of sensors replacing one sensor type with another, variations in sensors physical nature, variations in placement of one type of replaceable sensor module by another, specific to the proposed currency and amendment of algorithms or constant factors used in processing of signals from the replaceable sensor module. Even changes in the list of replaceable sensor module signals and changes to the internal digital exchange interface can be accomplished due to signals provided by the replaceable sensor module.

At the time of manufacture of the replaceable sensor module, it undergoes testing and basic individual sensor parameters and constant factors used during self-adjustment of the sensors and standardization of the sensors' signals are determined. These parameters and constant factors are then stored in the non-volatile memory 15 associated with the quantization unit 12.

When a bill acceptor is first turned on, it undergoes some self-testing, which includes the exchange of information with the replaceable sensor modules identifying their type and control signals, etc. Therefore, whenever a banknote acceptor is turned on, it undergoes this self-evaluation.

During normal use, when a bill is inserted into inlet 7, it is transported past the replaceable sensor modules which are located in the side walls of the pathway. The sensors of these modules detect certain physical properties of the banknote and convert these properties into an electrical signal. These signals then undergo primary processing in the replaceable sensor module prior to communication to the central processing unit 5 which, based on the standardized signal makes the determination with respect to validity.

The CPU and the replaceable sensor modules exchange data information in the form of digital messages having a syntech structure and field values which are specified according to the internal exchange interface protocol. This standardization allows for convenient updating of the replaceable sensor modules.

The central processing unit sends control instructions to the replaceable sensor modules and accepts a ready state signal from each replaceable sensor module and any sensor's digitized signal codes in exchange. The replaceable sensor module's sensors digitized signal codes are stored in the form of indexed data arrays in the central processing unit operating memory. Any following data is processed in compliance with the bill identification and verification algorithm which is specifically organized to unrestrain the processed data from the specific sensor's physical nature, number type and disposition of sensor in the banknote acceptor.

One of the primary advantages of the banknote acceptor, as described above, is the capability of switching from one currency to another. In this case, new replaceable sensor modules, appropriate for the new currency, are inserted into the device. In this case, the CPU will also require some changes, and can be reconfigured, for example, by replacing the appropriate parts of the program stored in the EPROM.

With a banknote acceptor, as shown herein, data acquisition and processing for final determination of authenticity are completely separated. The data acquisition step includes primary processing for conversion of the data to a known standard and to take into account individual parameters of the sensing devices. Thus, the signal of a sensor undergoes standardization, in most cases will be digitized, and the signal will be specifically formatted and transferred to the central processing unit through the internal exchange digital interface. The specifically formatted signals are then stored in RAM and processed in compliance with the algorithms stored in the central processing unit. This arrangement allows adjustments of the signal from the replaceable sensor modules, such that the data representing specific signals of sensors of the replaceable sensor module are unrestricted with respect to their particular physical nature type and location within the replaceable sensor module. The individual parameters of the sensors are taken into account during primary processing. Variable parts of the control programs and identification and verification programs of the central processing unit are modified separately. In this way, the number and quality of various types of paper means of payment, example, bills of various currencies, vouchers, etc., and a variety of denominations of bills which may be processed at the same time, are generally determined by the size of programs and memory of the processing capacity of the CPU. For example, the higher the capacity of the CPU, the greater number of sensor modules that cooperate with the CPU without modification for the CPU.

Although various preferred embodiments of the present invention have been described herein in detail, it will be appreciated by those skilled in the art, that variations may be made thereto without departing from the spirit of the invention or the scope of the appended claims.

What is claimed is:

1. In a banknote validator a sensing module for evaluating a banknote during movement past said sensing module; said sensing module comprising a casing housing a series of sensors for evaluating different properties of banknotes, a signal processing and quantization unit which includes individual parameters for each sensor, said signal processing and quantization unit receiving the signals of said series of sensors and converting said signals into corrected signals using said individual parameters, said signal processing and quanitzation unit outputting said corrected signal through an electrical interface connection exterior to said casing for connecting said sensing module with a central processing unit of the validator.

2. In a banknote validator as claimed in claim 1 wherein said housing encloses said series of sensors, and said signal processing and quantization unit.

3. In a banknote validator as claimed in claim 1 wherein said sensing module includes non volatile memory associated with said signal processing and quantization unit and said individual parameters for each of said sensors are stored in said non volatile memory.

4. In a banknote validator as claimed in claim 3 wherein said validator includes at least two sensing modules of the same outer configuration.

5. In a validator as claimed in claim 4 wherein said validator includes a self testing arrangement which when activated communicates a signal to said sensing module which provides said individual parameters for each of said sensors to said central processing unit.

6. In a banknote validator as claimed in claim 1 wherein said individual parameters correct the signal of the respective sensor for individual characteristics of the sensor allowing the corrected signal to be compared with respect to a standard.

7. In a banknote validator as claimed in claim 6 wherein said sensor module having said first series of sensors is replaceable with a sensor module having a different series of sensors without modifying said central processing unit.

8. In a banknote validator as claimed in claim 1, wherein each sensor module includes optical sensors and capacitance sensors.

9. A banknote validator comprising a banknote inlet for receiving a banknote, a transport arrangement for transporting banknotes along a pathway for processing, at least one removable sensor module located in a wall of said pathway for sensing properties of banknotes as the banknotes are transported along said pathway past said at least one removable sensor module, a central processing unit separated from said at least one removable sensor module and in electrical communication with said at least one removable sensor module to receive corrected digital signals of said sensor module and process and compare said signals to a standard for determining the authenticity of a sensed banknote, said at least one removable sensor module comprising a casing housing a series of sensors for evaluating different properties of banknotes, a signal processing and quantization unit which receives the signals of said series of sensors and converts said signals to compensate for individual characteristics of said series of sensors to produce said corrected digital signals and provide said corrected digital signals to said central processing unit, and an electrical interface connection exterior to said casing connecting said sensing module with said central processing unit.

10. A banknote validator as claimed in claim 9 wherein each sensing module includes individual parameters used by said signal processing and quantization unit during conversion of the respective signals of said sensors to compensate for known individual characteristics of each sensor.

11. A banknote validator as claimed in claim 10 wherein each sensing module includes non volatile memory associated with said signal processing and quantization unit and said individual parameters for each of said sensors are stored in said non volatile memory.

12. A banknote validator as claimed in claim 9 wherein said validator includes at least two sensing modules.

13. A banknote validator as claimed in claim 9 wherein each sensing module includes a code identifying the number of said sensors and the type of said sensors which code is provided to said central processing unit.

14. A banknote validator for assessing the authenticity of banknotes as each banknote is moved past a sensing arrangement comprising a banknote inlet for receiving a banknote, a transport arrangement for transporting banknotes along a pathway for processing, at least one removable sensor module located in a wall of said pathway for sensing properties of banknotes as the banknotes are transported along said pathway past said at least one removable sensor module, a central processing unit separated from said at least one removable sensor module and in electrical communication with said at least one removable sensor module to receive signals of each sensor module and process and compare said signals to standards for determining the authenticity of a sensed banknote, said at least one removable sensor module producing at least one signal reflective of the characteristics of each banknote as it moves past said sensor module and corrects said signal for individual characteristics of said sensor module to produce a standardized sensed signal of said banknote, said sensor module providing said standardized sensed signal of said banknote to said central processing unit for further processing.

15. A banknote validator as claimed in claim 14 wherein each sensor module includes a code signal identifying the number of sensors in said sensor module and the type of said sensors and said code signal is provided to said central processing unit.

16. A banknote validator as claimed in claim 14 wherein said central processing unit includes an arrangement for updating of said standards without replacement of said central processing unit.

17. A banknote validator as claimed in claim 14 wherein said at least one removable sensor module which produces said signal reflective of the characteristics of each banknote produces a digital signal which is reflective of the characteristics of each banknote.

18. A banknote validator as claimed in claim 14 wherein said at least one sensor module is two sensor modules located on opposite sides of said pathway.

* * * * *